United States Patent [19]
Fischer et al.

[11] 3,765,303
[45] Oct. 16, 1973

[54] INVOLUTE TOOTH SYSTEM FOR HELICAL GEARS AND FINISHING GEAR TOOL
[75] Inventors: Alois Fischer; Franz Hill, both of Friedrichshafen, Germany
[73] Assignee: Zahnradfabrik Friedrichshafen Aktiengesellschaft, Friedrichshafen, Germany
[22] Filed: Mar. 8, 1971
[21] Appl. No.: 122,085

[30] Foreign Application Priority Data
Mar. 10, 1970 Germany................. P 20 11 245.2

[52] U.S. Cl..................... 90/1.6, 29/159.2, 74/458
[51] Int. Cl...................................... B23f 19/06
[58] Field of Search........................................ 90/1.6

[56] References Cited
UNITED STATES PATENTS
2,372,444   3/1945   Mentley................... 90/1.6

Primary Examiner—Francis S. Husar
Attorney—Zalkind, Horne & Shuster

[57] ABSTRACT

Helical gears adapted to mesh while rotated about parallel axes, are finished by meshing engagement with a shaving cutter gear rotated about an axis at a fixed cutting angle to the rotational axis of the helical gear being finished. A contact ratio close to but never less than one is established during meshing engagement between the helical gear being finished and the finishing gear by designing the helical gear teeth profiles within the limits of a contact ratio range applicable to meshing helical gears rotating about parallel axes.

5 Claims, 4 Drawing Figures

INVENTORS
Alois Fischer
Franz Hill

ATTORNEYS
Zalkind, Horne & Shuster

INVENTORS
Alois Fischer
Franz Hill

ATTORNEYS
Zalkind, Horne & Shuster

INVOLUTE TOOTH SYSTEM FOR HELICAL GEARS AND FINISHING GEAR TOOL

This invention relates to the manufacture of helical gears by cutting gear blanks to standard involute profiles and then finishing the gears by a shaving process prior to surface hardening treatment.

A well known method of finishing gears having involute system tooth profiles, involves a shaving process in which a shaving cutter gear is rotated about an axis angularly related to the rotational axis of the workpiece gear with which it is enmeshed. In such finishing processes, the finishing gear and the workpiece gear are usually rotated about axes spaced from each other by a fixed distance so that both flanks of the meshing gear teeth come in contact with the teeth of the finishing gear under the force exerted by the finishing gear. Utilizing this type of finishing process, certain advantageous deviations from the involute profile may be effected adjacent the roots and tips of the teeth as well as the finishing of each tooth with a slight bulge of crown at the center. Also, a reduction in addendum and utilization of non-standard pressure angles may be effected.

Because of the simultaneous contact of both flanks of each workpiece gear tooth by the finishing gear, non-symmetrical contact forces occur on the flanks which results in depressions on the flank surfaces. Various attempts to ameliorate this problem have been made by modifying the flanks of the teeth on the shaving type finishing gear in order to establish a condition of symmetry. However, because of the unavoidable tolerances involved, prior proposed solutions to the problem have not produced sufficiently precise and predictable results. Flank depressions occurring as a result of the inadequacies of such prior solutions have sometimes aggravated the problem with a significant adverse affect on gear meshing relationships.

It is therefore an important object of the present invention to design parallel axes, helical gears so as to avoid the flank pitting problem that ordinarily exists in the finishing of such gears by the shaving process.

In accordance with the present invention, the tooth profile of a helical gear of the involute type is designed as to number of teeth, module, addendum, pressure angle, helix angle and involute profile deviation in order to confine meshing contact to only two flank contact segments during meshing engagement between each of said helical gears and the shaving cutter gear through which the helical gear is finished. Any odd flank contact segment accounting for the pitting problem is thereby eliminated. This is achieved by restricting the design of the helical gear teeth to a relatively low contact ratio range having upper and low limits that are functions of the helix angle at the pitch circlt of the helical gears. The contact ratio, between the tooth profiles lying in a plane perpendicular to the direction of the gear teeth, then applicable to the meshing relationship between the helical workpiece gear and the shaving cutter gear will be close to one (1) with a positive tolerance. As a result thereof, two-flank-contact segments lying on the path of contact of the gear are established, and three-or odd-number-of-flank-contact segments precluded.

A detailed description of the invention now follows in conjunction with the appended drawing in which.

Figure 1:
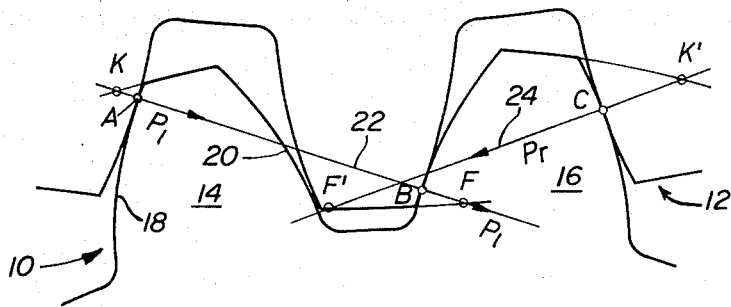
FIG. 1 illustrates the meshing relationship between an ordinary finishing gear cutter and a helical workpiece gear in a plane perpendicular to the longitudinal axis of the workpiece flanks.

FIG. 1 illustrates a portion of a spur gear profile 10 in a plane perpendicular to the longitudinal axis of the workpiece flanks. The gear profile is derived from a standard involute tooth system and is shown in meshing engagement with the gear profile 12 of a standard finishing cutter gear of the shaving type. Two complete teeth 14 and 16 are defined in FIG. 1 by the workpiece gear profile and each tooth profile includes the usual opposite flanks 18 and 20 on which conjugate engagement with the meshing gear occurs. The usual contact ratio for the conjugate meshing condition illustrated in FIG. 1 is about 1.3, with contact occurring along a line of action 22. Thus, the line of action 22 intersects the left hand flanks of gear teeth profiles 14 and 16 at contact points A and B. Insofar as the right hand flanks 20 are concerned, a single contact point C is established on the line of action 24 where it intersects the right hand flank 20 of gear tooth 16. The force denoted $P_r$ originating from contact point C the line of action 24 will be distributed between contact points A and B as forces denoted $P_1$ in FIG. 1. Under equilibrium conditions the two forces $P_1$ will be balanced by the force $P_r$. Since force $P_r$ will be about twice that of $P_1$, a flank pit will develop at point C on the right hand flank 20.

Figure 2:
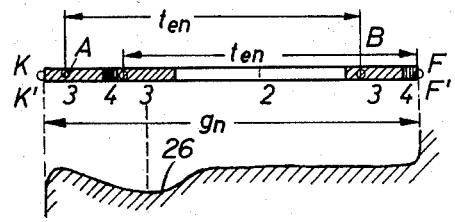
FIG. 2 is a contact segment and flank surface diagram corresponding to FIG. 1.

The length of contact along the line of contact 22 is denoted by line segment KF in FIG. 1 while the length of contact along line 24 is denoted by line segment K'F'. Segmental sections of the gear 10 through the lines of action are shown in FIG. 2 between points K and F (or K' and F') having a length denoted by $g_n$. As is well known, the effective circular pitch for a helical gear is the distance between contact points, A and B of two consecutive corresponding profiles denoted by $t_{en}$ in FIG. 2. Since the contact ratio of the meshing gear profiles in FIG. 1 is greater than one (1.3 as aforementioned), the length of contact $g_n$ is greater than the effective circular pitch $t_{en}$ since by definition the contact ratio $En = g_n/t_{en}$. Accordingly, contact occurs along three spaced flank segments resulting in the formation of a flank pit 26 approximately the distance $(t_{en})$ from the dedendum point of contact at F' as illustrated by the involute surface diagram in FIG. 2.

Figure 4:
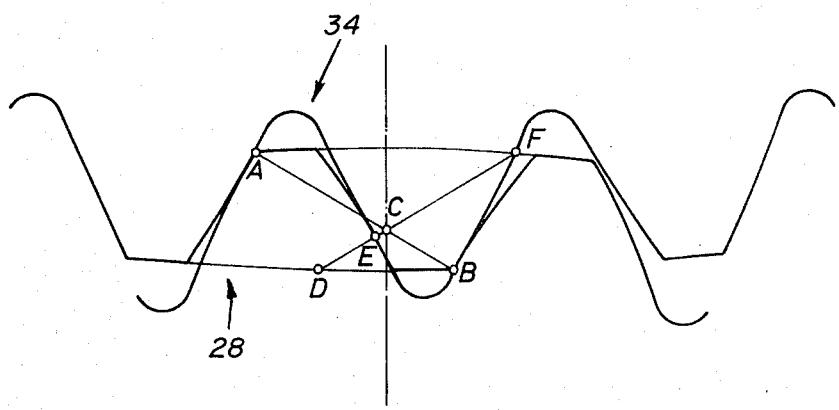
FIG. 4 illustrates the meshing relationship between a finishing gear and helical workpiece gear in accordance with the present invention.

If the length of contact $g_n$ were equal to $t_{en}$, corresponding to an ideal contact ratio ($En = 1$), then the odd flank segment is eliminated. FIG. 4 illustrates the conjugate meshing action between helical gear 28 and a fishing gear 34 having the referred to ideal contact ratio in a plane normal to the wheel axis. The contact action line is shown between points A and B on the left hand flanks of the teeth of gear 28 at a position wherein the tooth at point A about to move out of contact while contact starts at B. In this position, contact occurs on the right hand flank at point E along the contact action line DF intersecting contact action line AB at pitch point C. Thus, in all other positions of the gear 28, the left and right hand flanks are each engaged at only one contact point avoiding the pit forming problem described with respect to FIGS. 1 and 2.

Figure 3:
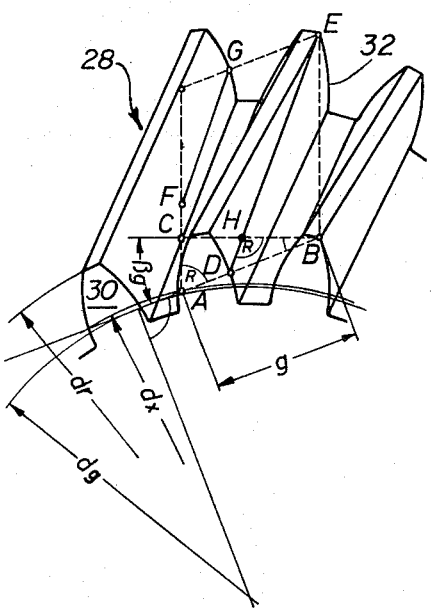
FIG. 3 is a partial perspective view of a helical involute gear, illustrating tooth profile geometry in accordance with the present invention.

The helical gears are therefore designated in accordance with the present invention to produce a contact ratio (En) close to one, but never less than one to preserve correct kinematic relationships during the gear finishing operation. This involves the design of the helical gear profiles from the standard involute system establishing some other value of contact ratio (Ep) during mesh between two such helical gears rotating about parallel axes. FIG. 3 illustrates the geometrical relationships of such a helical gear 28 having a base circle diameter dg and an addendum circle diameter dr. A contact section plane ABEG, through contact points A and B in the profile face 30 lying in the plane perpendicular to the axis of the helical gear is shown by dotted line. The contact line segment between contact points A and B of length g lies between the circle of smallest effective diameter dx and addendum circle and is tangent to the base circle as is the usual case for meshing gears rotating about parallel axes. For meshing engagement of gear 28 with a finishing gear having a rotational tool axis at an angle to the axis of gear 28, the contact action line segment is BC in the same contact section plane perpendicular to the tooth direction such that $\overline{BC} = g/\cos \beta\, g$ where $\beta\, g$ is the helix angle of helical gear 28. BC intersects the line of contact DE on one side of the contacting gear 28 at point H. Line segment BH the one contact segment during the finishing operation which differs from the corresponding contact segment during parallel axes gear mesh represented by BD, in view of the different contact ratios respectively involved. It will be further apparent from the geometrical relationships illustrated in FIG. 3, that:

$$AB = BC \cos \beta\, g \text{ and } BD = BH/\cos \beta g$$

As is well known, the contact ratio for the meshing parallel axes gears is: (1) $Ep = g/\pi\, Msg$, where g is the contact length along the line of action (AB in FIG. 3) and Msg is the module for the corresponding spur gear profile on face 30. Where the rotational axes of the gears are in a crossed relation to each other, the contact ratio is:

(2) $En = g/\pi\, Mng \cos \beta\, g$, where Mng is the effective module for the helical gears in the base circle and $\beta\, g$ is the helix angle as shown in FIG. 3. Since, (3) $Mng = Msg \cos \beta g$, then (4) $Ep = En \cos^2 \beta\, g$ Assuming the finishing gear has the same effective diameter dx as the workpiece gear, the foregoing equations are applicable to the meshing relationship between a helical workpiece gear and a finishing gear provided the same effective diameter is utilized for the finishing gear. However, to be effective the finishing gear must have an effective diameter somewhat less than dx for external type gears and somewhat more than dx for internal gears. Therefore, equation (4) must be modified so that;

(5) $Ep < En \cos^2 \beta g$,

Inasmuch as the addendum circle of a gear ordinarily has a minus tolerance which would tend to decrease the theoretical ideal contact ratio $En = 1$, a positive tolerance must be used for design purposes which from experience is determined to be approximately +0.10. The largest possible value for En is therefore 1.10 and expression (5) becomes:

(6) $Ep < 1.10 \cos^2 \beta\, g$.

Further, in order to avoid interference between the tip of the finishing gear and the root of the helical gear being finished, it has been determined that:

(7) $Ep > 0.7 \cos^2 \beta\, g$, or (8) $1.10 \cos^2 \beta\, g > Ep > 0.7 \cos^2 \beta\, g$ Although the contact ratio Ep must lie between the limits indicated by expression (8) and will in the case of the usual helix angles be less than one, this condition is tolerable for helical gears since more than one pair of teeth will occupy the zone of action to preclude any loss of contact.

The contact ratio of helical gears is determined from known geometrical relationships and depends on gear design factors such as the number of teeth, true circular pitch, addendum height factor, pressure angle, helix angle, and profile deviations. For normal helix angles (15° – 45°) and a standard pressure angle of 20°, an addendum height factor (y) of less than the standard value of 1 will be required in order to obtain contact ratios within the indicated range of the present invention. This is advantageous since a shorter tooth has a higher bearing strength. Thus, it has been found that the design conditions as hereinbefore indicated can be met by use of an addendum height factor (y) within the range:

(9) $0.3 < y < 1.0$

Within the foregoing design limits, a standard pressure angle as high as 30° may be utilized. Further, to meet the design limits, the teeth must be separated at the root circle by a root curvature 36 as shown in FIG. 4 having a radius greater than 0.2 times the module of the tooth profile.

A helical gear adapted to mesh with another helical gear rotatable about an axis parallel to the axis of said first mentioned gear and having its teeth profiled to establish a contact ratio during meshing engagement with said other helical gear that is between $0.7 \cos^2\beta_g$ and $1.1 \cos^2\beta_g$ and having an addendum factor y which is greater than 0.3 but less than 1.0 and being profiled for a pressure angle between 20° and 30° can also be made advantageously by a method including the steps of rough cutting the gear with substantially involute tooth profiles, heat treating said gears, and finishing the flanks of the gear teeth by meshing engagement of each of the gears with finishing roller gears rotatable about tool axes parallel to the rotational axis of the workpiece gear.

We claim:

1. A method of making helical gears having helix angles $\beta\, g$ and adapted for conjugate meshing while rotatable about parallel rotational axes including the steps of: cutting the teeth of said gears with substantially involute tooth profiles limited to contact ratios that are greater than $0.7 \cos^2 \beta\, g$ and less than $1.1 \cos^2\beta\, g$; and finishing the flanks of said teeth of the helical gears by meshing engagement with a finishing gear.

2. A method of making helical gears adapted for conjugate meshing engagement while rotatable about parallel rotational axes, including the steps of: cutting said gears with substantially involute tooth profiles limited to a predetermined contact ratio range; and finishing the flanks of the teeth of each of said helical gears by meshing engagement with a finishing gear rotatable about a tool axis in crossed relation to the rotational axis of the helical gear to establish an ideal contact ratio during said latter meshing engagement, said ideal contact ratio being between 1.00 and approximately 1.10.

3. A method of making helical gears adapted for conjugate meshing engagement while rotatable about parallel rotational axes, including the steps of: cutting said gears with substantially involute tooth profiles limited to a predetermined contact ratio range; and finishing the flanks of the teeth of each of said helical gears by meshing engagement with a finishing gear rotatable about a tool axis in crossed relation to the rotational axis of the helical gear to establish an ideal contact ratio during said latter meshing engagement, said predetermined contact ratio range for the helical gears having a lower limit of $0.7 \cos^2\beta\ g$ and an upper limit of $1.1 \cos^2\beta g$, where $\beta\ g$ is the helix angle of the helical gears.

4. A method of making helical gears adapted for conjugate meshing engagement while rotatable about parallel rotational axes, including the steps of: cutting said gears with substantially involute tooth profiles limited to a predetermined contact ratio range; and finishing the flanks of the teeth of each of said helical gears by meshing engagement with a finishing gear rotatable about a tool axis in crossed relation to the rotational axis of the helical gear to establish an ideal contact ratio during said latter meshing engagement, said predetermined contact ratio range including contact ratios that are less than one while the ideal contact ratio is close to but never less than one.

5. The method of claim 4, wherein said flanks are finished by a shaving action, said finishing gear being a cutter.

* * * * *